Nov. 16, 1954 P. M. GENDRON 2,694,470
CONTROL DEVICE FOR CHANGE-SPEED AND REVERSING MECHANISM
Filed May 24, 1950 2 Sheets-Sheet 1

Inventor:
PIERRE MARIE GENDRON
by: Attorney

Nov. 16, 1954 P. M. GENDRON 2,694,470
CONTROL DEVICE FOR CHANGE-SPEED AND REVERSING MECHANISM
Filed May 24, 1950 2 Sheets-Sheet 2

Inventor:
PIERRE MARIE GENDRON

Attorney

United States Patent Office 2,694,470
Patented Nov. 16, 1954

1

2,694,470

CONTROL DEVICE FOR CHANGE-SPEED AND REVERSING MECHANISM

Pierre Marie Gendron, Boulogne-Billancourt, France, assignor to Societe a Responsabilite Limitee dite Mecanique Navale Gendron, Boulogne-Billancourt, France Application May 24, 1950, Serial No. 163,825

Claims priority, application France May 28, 1949

4 Claims. (Cl. 188—151)

Cyclic gear train mechanisms are known in which changes in drive ratio and/or reversal in the drive from a drive to a driven shaft may be obtained by retarding or blocking certain definite pinions and planetary-carriers in the mechanism.

It is the object of this invention to provide a blocking control device, applicable to mechanisms of the class just defined and more especially to drive reversers-and-reducers of the kind used on board ship and operating on the lines just described.

A control device according to the invention is essentially characterized by the fact that it comprises a single braking member adapted to have a non-rotational sliding movement imparted to it to engage and block a selected one of two rotary elements arranged on opposite sides of said braking member, and further to assume an intermediate neutral position. The braking member thus makes it possible to obtain either one of two drive ratios (for instance a forward speed and a reverse).

The sliding brake member preferably comprises two symmetrically disposed conical surfaces adapted first to retard, then to block by frictional engagement co-operating surfaces respectively rigid with the rotary elements to be blocked. The displacement of the braking member may be obtained through any form of power, mechanical, hydraulical, pneumatical or electrical in character.

Further in the device forming the subject of this invention, the blocking or braking member and the fixed supporting part over or within which said member is slidable comprise one or more transverse interengaging flanges and grooves so disposed that the braking member may be caused to slide in either direction by delivering a fluid under pressure into the spaces between predetermined ones of the adjacent faces of said flanges and grooves, spring means being provided to restore the blocking member to its neutral position after said pressure has been relieved.

A yet further object of this invention is to provide a control device of the type described which comprises a blocking or braking member consisting of an annulus slidable over the inner surface of the mechanism casing and having a single groove formed in its outer periphery, a fixed flange in said casing subdividing said groove into two separate chambers and two inlet apertures respectively opening into said chambers, a distributor for selectively delivering pressure fluid through either one of said apertures so as to force the braking member into either direction, a source of pressure fluid supplying said distributor, and springs in each of said chambers acting to restore said braking annulus to its neutral position in the absence of fluid pressure in either chamber.

It will be seen that the arrangement according to the invention has the advantage of making a large area available for the application of the fluid pressure, this large area being secured either by providing a multiplicity of grooves and partitions in the braking member and its supporting member, or by imparting a large diameter to the braking annulus slidable over the inner surface of the casing, or further by the simultaneous use of both of these features.

Further objects, features and advantages of the invention will appear as the description proceeds, as set forth in connection with a specific embodiment of the invention selected as an example and applied to reducer-and-reverser mechanism for ship's machinery.

In the accompanying drawings:

2

Figures 1a and 1b are sectional views of the fluid distributor arrangement in two of the positions assumed by it.

Figure 1:
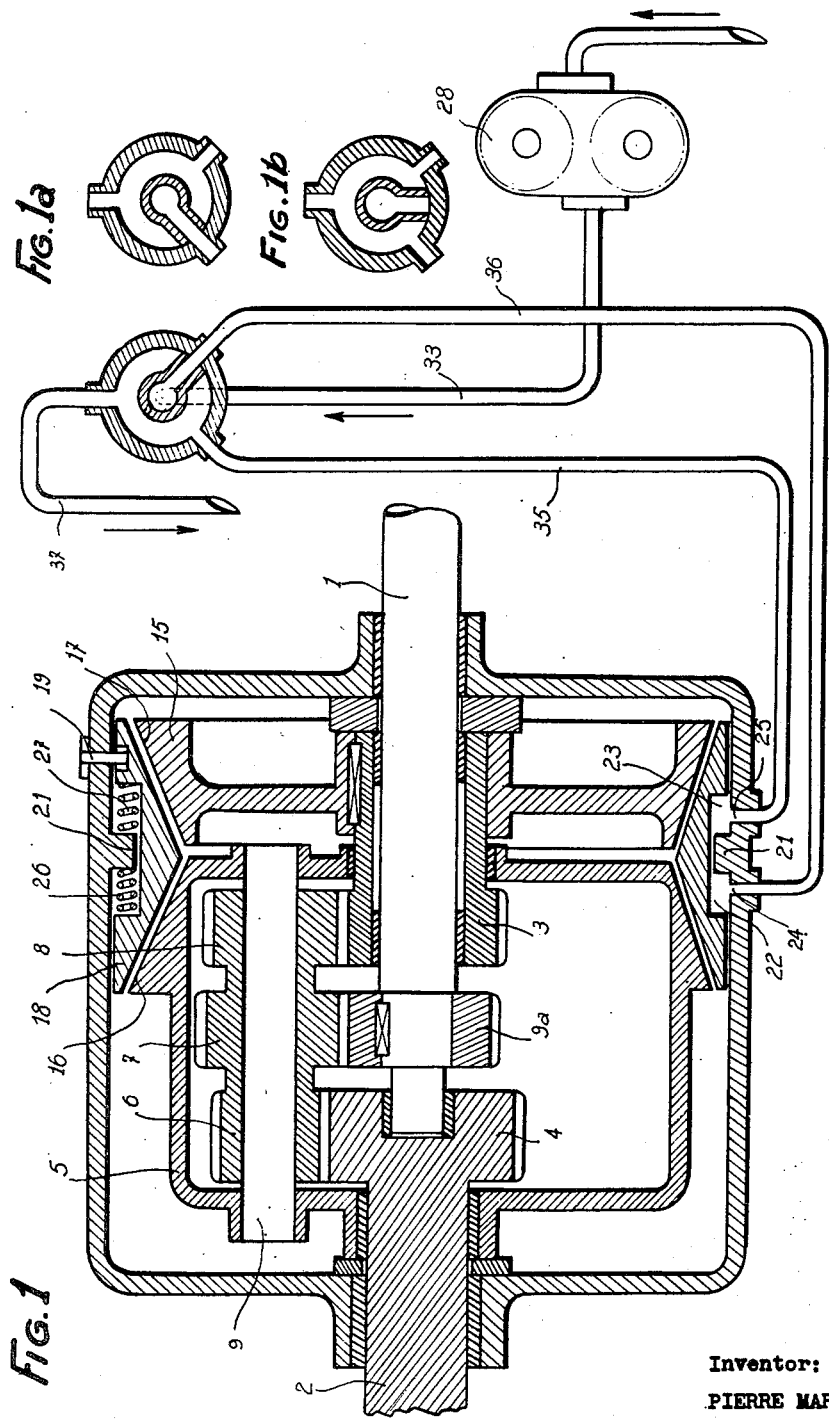
Figure 1 is a diagrammatic view in cross section of a reducer-reverser unit provided with a device according to the invention.

In the reducer and reverser unit illustrated, the drive is transmitted from a drive shaft 1 to a driven shaft 2 through the agency of an epicyclic gear train of conventional type which comprises two sun-gears 3 and 4, the sun gear 3 being freely rotatable on the drive shaft 1 and the sun gear 4 being secured to the driven shaft 2, a planetary-carrier cage 5 rotatable about the common axis of the sun gears, and three planetary pinions 6, 7 and 8 secured on a shaft 9 journalled within the carrier cage 5. A drive pinion 9a is secured on the drive shaft and meshes continually with the central planetary gear 7. The end of the drive shaft is journalled in a roller bearing 10 housed within the sun gear 4 rigid with the driven shaft. The planetary carrier cage 5 is journalled on a pair of roller bearings 11 and 12, the bearing 11 being supported on the driven shaft and the bearing 12 being supported on a cylindrical portion rigid with the sun gear 3. The planetary-carrier shaft 9 is journalled on a roller bearing 13 and a ball bearing 14. Forward drive and reverse are respectively secured by braking and blocking, respectively, the sun gear 3 through the clutch disc 15 rigid therewith, and the planetary carrier cage 5. The braking action is exerted, as more fully described later on, upon two frustoconical surfaces 16 and 17 respectively carried by the planetary-carrier and the clutch disc.

Figure 2:
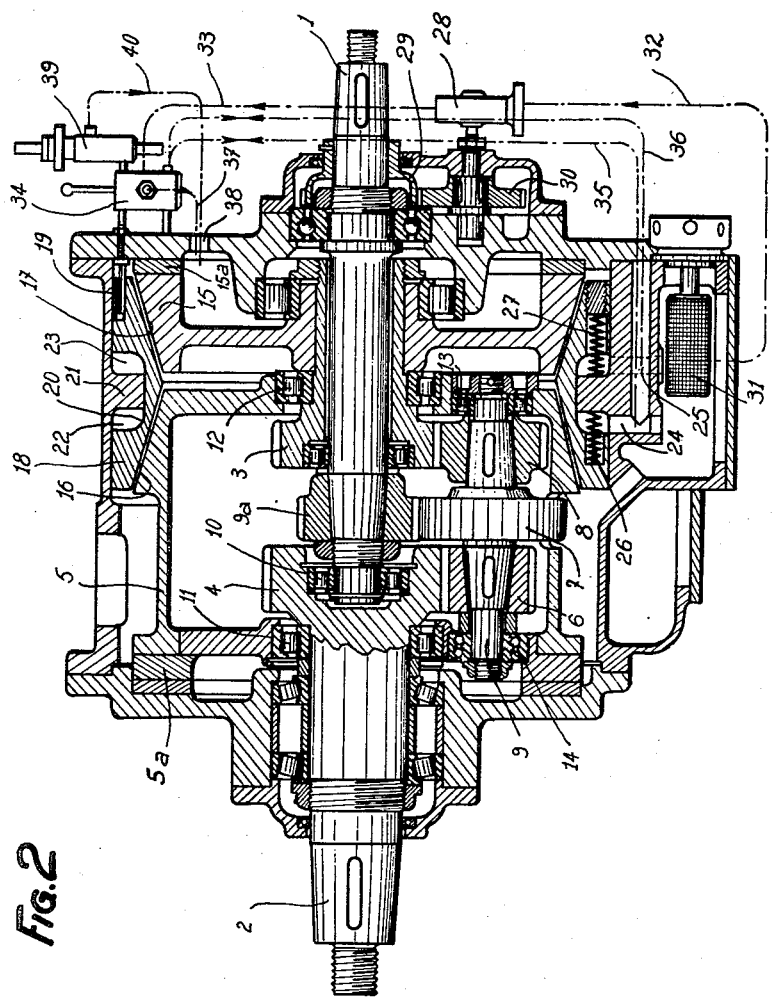
Figure 2 is a more detailed view of the same reducer-reverser unit with parts in section and parts broken away.

Forward drive is obtained by blocking the planetary carrier; in this case the power path from the drive to the driven shaft is through the gear train which comprises the drive pinion 9a, the planetary pinion 7, a planetary pinion 6 and to sun gear 4 rigid with the driven shaft. As shown in Fig. 2, the drive ratio through this gear train is less than unity, and accordingly the speed of rotation is reduced from the drive shaft to the driven shaft, as required.

Reverse drive is secured by blocking the clutch disc 15 and consequently the sun gear 3 rigid therewith. In this case, the planetary-carrier obviously is caused to revolve, since the planetary pinion 8 cannot rotate the fixed sun gear 3, and the various gears of the mechanism are so dimensioned and correlated that the driven shaft 2 is driven from the planetary pinion 6 in reverse direction from the drive shaft 1 and at a speed substantially equal to the speed of forward drive. If no braking action is applied, either on the planetary carrier nor on the clutch disc 15, the driven shaft 2 remains stationary, since the planetary carrier then revolves with the planetary pinion 6 rolling simply over the sun gear 4.

The braking action which forms the specific subject matter of this invention, is produced by a bi-conical braking annulus 18 slidable over the inner well of the casing of the reducer-reverser unit. This braking annulus is prevented from rotating by sliding pins 19 secured in the casing wall. The annulus can assume any one of three positions: An intermediate position in which no braking action is exerted, and two end or side positions in which the annulus is adapted to brake or block frictionally, either the conical surface 16, or the conical surface 17 rigid respectively with the planetary-carrier 5 and the clutch disc 15.

The planetary-carrier cage 5 and the clutch disc 15 are adapted to engage, respectively, disc clutches 5a and 15a rigid with the casing, when subjected to the action of the bi-conical braking annulus 18. The said clutches take up the axial thrust exerted by the bi-conical annulus and participate in braking and blocking the planetary carrier cage and the clutch disc.

The braking annulus is peripherally formed with a groove 20 and a flange 21 cast integral with or secured to the casing projects into the bottom of this groove which it thus divides into two chambers 22 and 23. The flange 21 is arranged to stand at the midpoint of this groove 20 when the braking annulus 18 itself stands in its intermediate neutral position. Two ports 24 and 25 respectively open into the chambers 22 and 23 and enable pressure to be exerted in either chamber in order to produce either forward or reverse drive. Two springs 26 and 27 each housed in one chamber, restore the braking annulus 18 to its intermediate position when neither of the chambers is subjected to pressure.

The pressure serving to force the bi-conical braking annulus towards either one of its end positions is provided by a hydraulic circuit supplied with lubricating oil contained in the casing of the reducer-reverser unit.

A pump 28 driven from the drive shaft through pinions 29 and 30, draws oil into the casing through a filter 31 and a conduit 32. The oil drawn in by the pump is forced through a conduit 33 into a distributor 34 illustrated in diagrammatic cross section in Fig. 1, and which may be of any known type forming no part of the invention. This distributor may be caused to assume any one of three different positions. In the position corresponding to Fig. 1, the oil discharged by the pump is delivered through the conduit 36 into the chamber 22 and consequently forces leftward the bi-conical braking annulus which blocks the satellite-carrier cage. In this case forward drive is secured.

In the position illustrated in Fig. 1a, the oil discharged by the pump is delivered over the conduit 35 into the chamber 23 and forces rightwards the bi-conical braking annulus which this time will block the clutch disc 15 and consequently the sun gear 3 rigid with it; this provides reverse drive.

In the position illustrated in Fig. 1b, neither of the chambers 22 or 23 is subjected to oil pressure and the bi-conical braking annulus is accordingly located in its intermediate or neutral position owing to the action of springs 26 and 27.

When oil pressure is applied into either one of the chambers 22 or 23, the return flow of the oil into the casing is effected through one of the conduits 35 and 36 and through the conduit 37 which delivers into the top of the casing through the aperture 38. A pressure-limiting valve 39 is branched on the conduit 33 which connects the pump with the distributor; this valve directly delivers the oil discharged by the pump into the aperture 38 and the casing through the conduit 40, by-passing the distributor, in the case of an accidental excess of pressure.

The operation of the reducer-reverser unit just described should be clearly apparent from the description and it would be superfluous to give more lengthy explanations.

It will be clearly seen from the foregoing disclosure that a device according to the invention makes it possible to exert a controlling pressure over a very large area and consequently to reduce such pressure with desirable consequences; moreover, simultaneous blocking of the planetary-carrier cage and the clutch disc is impossible so that breakdowns liable to occur in other known devices as a result of such blocking are herein positively prevented. A device according to the invention has the further advantage of automatically compensating for wear in the elements participating in the braking action by simply increasing the travel of the bi-conical braking annulus. It should further be noted that the reversal of drive is never jerky owing to the back-pressure prevailing in that chamber (22 or 23) which is not subjected to pressure from the pump.

Finally, the braking member, because it is only capable of sliding movement without rotation, is free of the serious defects inherent to known braking members which move with a helical screwing and unscrewing motion and are therefore liable to become jammed or to yield under the contact of the rotary elements that are to be blocked.

It can be said in conclusion that the device of the invention is safe and practically incapable of getting out of order.

Many modifications in detail may be made in the mechanism described without exceeding the scope of the present invention.

It is expressly stated that while only one groove in the annulus was shown in the exemplary embodiment illustrated, any desired number of grooves may be provided, each having a related flange extending into it from the inner casing surface, and the hydraulic circuit arrangement being so made that pressure fluid may be delivered simultaneously into all of the chambers defined on one and the same side of the respective grooves by the related flanges. This, as previously stated, will make it possible to increase the useful pressure area to any desired value, and thus to reduce the necessary pressure and/or the diametric dimension of the mechanism.

What I claim is:

1. A drive-selector arrangement which comprises a braking annulus axially slidable, but not rotatable in a casing between end positions for selectively braking either of two axially-spaced rotary elements within said casing, at least one annular groove in the outer periphery of said annulus and a fixed annular flange projecting radially inward into said groove, said flange being smaller in axial extent than said groove to define two axially-spaced pressure chambers therein, means for selectively delivering pressure fluid into and from said chambers and means urging said annulus to a neutral position with the flange centrally positioned in said groove whereby both of said elements are disengaged from said braking annulus.

2. Drive selector device as in claim 1 wherein said braking annulus is provided with a pair of oppositely divergent frustoconical braking surfaces for selective engagement with complementary frusto-conical surfaces on the elements.

3. A drive selector arrangement which comprises a braking annulus having an outer periphery slidable axially against an inner peripheral surface of a casing, two axially-spaced rotary elements in said casing opposite annular friction surfaces on said annulus for selective braking engagement with either of complementary friction surfaces on the elements, means preventing rotation of said annulus in the casing, at least one annular groove in said outer periphery of the braking annulus and a fixed annular flange projecting radially inward into sliding engagement with the bottom wall of said groove to define two pressure chambers in said groove, spring means acting between the opposite walls of said groove and the adjacent walls of the related flange to urge said braking annulus to an intermediate position wherein both of said rotary elements are disengaged from said braking annulus, fluid inlets into said chambers, hydraulic circuit means including a pump and a selective distributor for selectively delivering oil from a source to said chambers on a desired side of said flange and back to said source, and a pressure-limiting valve by-passing said distributor to deliver oil direct from said pump back to said source in case of an excess pressure in said chambers.

4. A drive selector arrangement as in claim 3 further comprising a backing friction surface on each of the rotary elements on the side thereof remote from the complementary friction surface engageable with said braking annulus, and respective co-operating friction surfaces in the casing for engagement with said backing friction surfaces.

References Cited in the file of this patent

UNITED STATES PATENTS

| Number | Name | Date |
| --- | --- | --- |
| 918,652 | Bryan | Apr. 20, 1909 |
| 1,839,088 | De Normanville | Dec. 29, 1931 |
| 1,948,190 | Shelor | Feb. 20, 1934 |
| 2,005,726 | Banker | June 25, 1935 |
| 2,418,455 | Banker | Apr. 8, 1947 |

FOREIGN PATENTS

| Number | Country | Date |
| --- | --- | --- |
| 96,868 | Austria | May 10, 1924 |
| 481,715 | Great Britain | Mar. 16, 1938 |
| 861,856 | France | Feb. 19, 1941 |
| 908,131 | France | Apr. 1, 1946 |